: 3,523,996
PROCESS FOR MAKING FOAM RUBBER
Stephen M. Kordiak, Orange, Conn., assignor to The
B. F. Goodrich Company, New York, N.Y., a corporation of New York
Filed June 13, 1966, Ser. No. 556,997
Int. Cl. B29b 3/00; B29c 1/00; B29h 3/02
U.S. Cl. 264—299                                    1 Claim

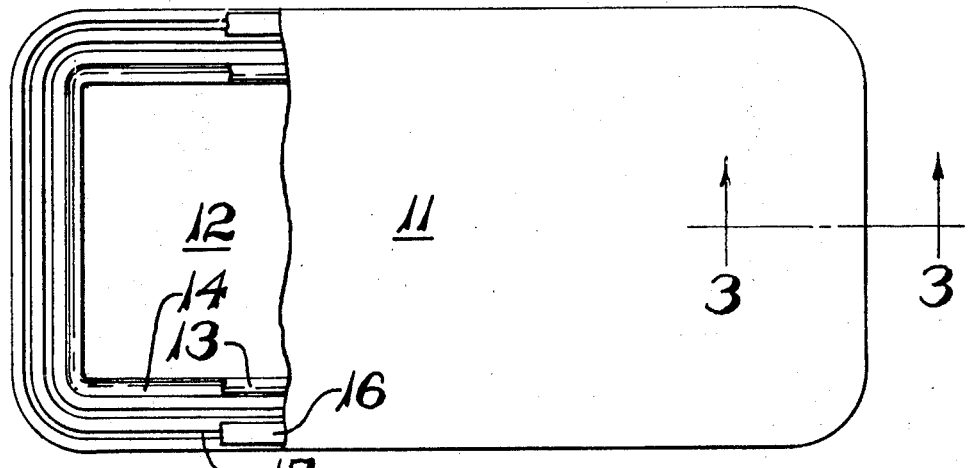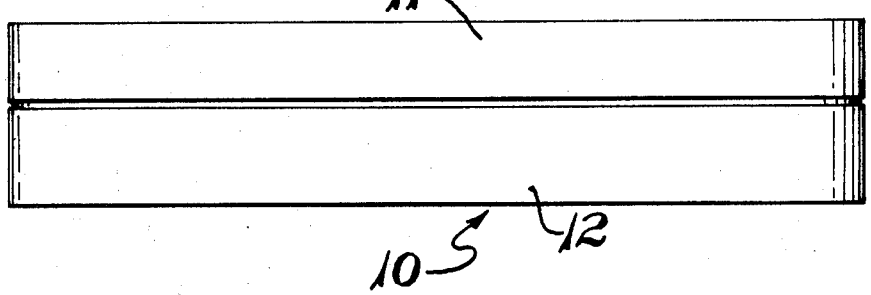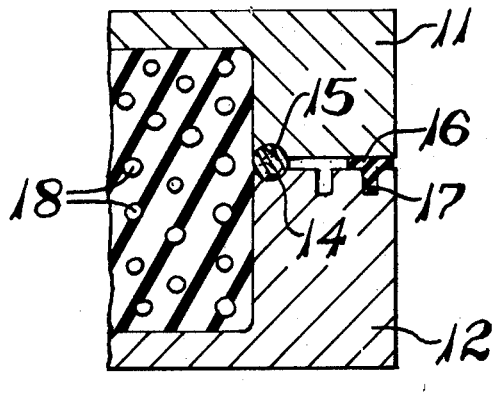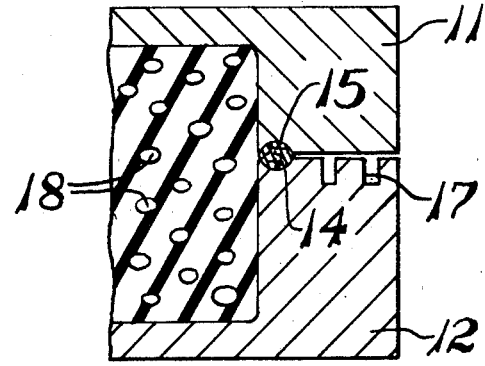

ABSTRACT OF THE DISCLOSURE

In the manufacture of latex foam rubber products (such as mattresses, furniture cushions, pillows and slab pieces) in closed-molds, internal splits or fissures often are noticed in the vulcanized product. The splits or fissures normally extend generally parallel to the broadside faces of the product and probably occur because of dimensional changes in the mold cavity resulting from cooling and/or heating of the mold in the formation of the congealed latex foam structure. Such internal splits or fissures are eliminated in the finished vulcanized product when the congealed, but unvulcanized, latex foam, while still within the mold cavity, is compressed slightly in a direction generally normal to the top and bottom broadside faces of the shaped latex foam and the compressed congealed mass thereafter is vulcanized in such condition.

---

This invention relates to the manufacture of latex foam rubber and pertains more particularly to a process for making molded latex foam rubber products which includes the step of compressing the congealed latex foam before vulcanizing the foam in order to eliminate the development of internal splits or fissures in the vulcanized product.

In the commercial manufacture of molded latex foam rubber, the latex is converted into a froth or foam, congealed and thereafter vulcanized. The conversion of the latex into a froth or foam can be accomplished by various methods, including whipping or beating air into the latex and the use of chemical blowing agents which produce small bubbles of gas in the latex to create the foam structure. A technique which is used extensively commercially for converting the latex into a latex foam structure involves whipping or beating the latex into a froth followed by expansion of the bubbles of air thereby introduces into the latex by subjecting the froth to a pressure reduction accomplished by evacuation of air from the mold cavity after a predetermined quantity of the latex froth has been charged into the mold cavity and the mold has been closed. The congealing of the latex foam is accomplished commercially either by introducing a delayed action coagulant into the latex foam just before introducing the latex foam into the mold or by freezing the latex foam while it is in the mold and causing a coagulating acid gas such as carbon dioxide to pass through the frozen mass. The congealed latex foam then is heated in the mold to vulcanize the foam. The resulting vulcanized latex foam rubber product thereafter is removed from the mold, is washed (if desired) and is dried.

In the manufacture of relatively flat molded latex foam rubber products (such as furniture cushioning, mattresses, pillows, and slab pieces) in the manner described above, it has been observed that one or more internal splits or fissures extending between and in a direction generally parallel to the top and bottom broadside faces of the molded product frequently are present in the finished product. These internal splits may develop as a result of several factors but appear to occur before significant vulcanization of the foam rubber has been effected. Probably the splits are the result of dimensional changes in the mold cavity resulting from cooling and/or heating the mold in the formation of a congealed latex from structure. Regardless of the reason for the formation of the splits, the internal splits in the finished molded product objectionably affect the physical characteristics of the product and often cause a premature failure of the product. The internal splitting even may be so extensive that the product separates into two sections when the mold is opened or when it is attempted to remove the molded product from the mold.

The present invention eliminates the internal splitting of the molded latex foam rubber previously experienced. In accordance with the invention, the congealed, but unvulcanized, latex foam is compressed slightly in a direction generally normal to the top and bottom broadside faces of the molded product without being removed from the mold before the congealed foam is vulcanized. As a result, any internal separations which already have developed are eliminated by once again bringing the congealed, but unvulcanized, latex foam adjacent the split in contact again.

The invention will be more fully understood from the following description of an embodiment of the invention and by referring to the drawings, in which:

FIG. 1 is a plan view, partly broken away, of a mold for shaping a relatively flat latex foam rubber product such as a mattress;

FIG. 2 is an elevation view of the mold shown in FIG. 1;

FIG. 3 is an enlarged fragmentary section view on the line 3—3 of FIG. 1 showing the mold cavity filled with congealed, but unvulcanized, latex foam; and FIG. 4 is a view similar to FIG. 3 except showing the T-shaped gasket between the mold halves removed and the two mold halves brought closer together to compress slightly the congealed, but unvulcanized, latex foam in a direction generally normal to the top and bottom broadside faces of the shaped foam before vulcanizing the foam.

Referring to the drawings, the mold 10 is comprised of an upper mold section 11 and a bottom mold section or dish portion 12. A porous gasket 13, such as is described in U.S. Pat. No. 2,731,669, is fitted into a channel 14 in the bottom mold section 12, which channel 14 is positioned adjacent the periphery of the mold cavity, and fits into a complementary channel 15 in the upper mold section 11 when the mold 10 is closed. A T-shaped gasket 16 with its leg fitted into a channel 17 in the bottom mold section 12 and with its top bar or head positioned between the halves 11 and 12 of the mold 10 maintain the mold halves 11 and 12 slightly spaced from each other, as is shown clearly in FIG. 3. Usually, the T-shaped gasket 16 is formed of a relatively non-compressible flexible material so that the mold halves are maintained spaced apart from each other a distance essentially equal to the vertical thickness of the head of the gasket 16, a spacing of approximately .060" generally being employed.

In utilizing the mold 10 for producing a molded latex foam rubber product, the mold cavity is filled with an uncongealed latex foam by any of the conventional methods. Thus, the cavity of the mold 10 can be filled completely with a latex composition which has been whipped or beaten into a froth before being charged into the mold; or a predetermined quantity of latex composition to which a suitable blowing agent (such as that suggested in U.S. Pat. No. 2,786,038) has been added can be charged into the mold cavity to only partially fill the cavity and the mold closed immediately after charging and an interval of time allowed to elapse to permit the blowing agent to expand the latex into a foam which completely fills the mold cavity; or a predetermined quantity of latex composition which has been whipped or beaten into a froth before being charged can be introduced into the mold cavity to only partially fill the cavity and the mold closed after which air is evacuated from the mold cavity to reduce the pressure within the mold cavity and thereby cause the latex foam in the mold cavity to expand (as a consequence of expansion of the small bubbles of air in the foam) and fill the cavity with foam. The latex foam then is congealed by any of the known methods, such as through the use of a delayed action coagulant added to the latex composition (as described in U.S. Pat. No. 1,852,447) or by freezing the latex foam and thereafter causing an acid coagulating gas to pass through the frozen foam (as described in U.S. Pat. No. 2,432,353). In accordance with the present invention the congealed foam then is compressed slightly in a direction generally normal to the top and bottom broadside faces of the molded foam. This may be accomplished in the embodiment shown in the drawings by opening the mold 10 sufficiently to enable an operator to remove the T-shaped gasket 16 which maintains the two mold sections 11 and 12 spaced from each other. The mold 10 again is closed and, since the T-shaped gasket 16 no longer is present to maintain the mold sections spaced apart the two mold halves 11 and 12 now can be forced closer together than when the T-shaped gasket 16 was in place, as shown in FIG. 4. Since gasket 13 is porous and somewhat compressible, this gasket is compacted somewhat as the mold halves 11 and 12 are forced closer together. In forcing the mold halves closer together the congealed, but unvulcanized, latex foam in the mold cavity will be compressed slightly in a direction generally normal to the top and bottom faces of the shaped foam. As is illustrated in FIG. 3, the cells 18, 18 of the congealed latex foam before the removal of the T-shaped gasket 16 from the mold are essentially spherical in shape. However, after the T-shaped gasket 16 has been removed from the mold and the mold again has been closed, the cells 18, 18 of the congealed latex foam have been flattened somewhat, as is illustrated in FIG. 4. Desirably, the congealed, but unvulcanized, latex foam is compressed in a direction generally normal to the top and bottom broadside faces of the molded foam an amount which equals from 0.1 to 5.0 percent of the original height between the top and bottom broadside faces before compression, or, stated another way, the congealed, but unvulcanized, latex foam is compressed in a direction generally normal to the top and bottom broadside faces of the molded foam until the height of the compressed foam is from 95.0 to 99.9 percent of the original height of the molded foam before compression was undertaken. With the latex foam in the compressed condition, heat is supplied to the mold to cause vulcanization of the latex foam confined within the mold. After the latex foam has been vulcanized, the mold is opened and the latex foam rubber is removed from the mold.

Various other techniques other than that described above can be employed for compressing the congealed latex foam before it is vulcanized. For instance, the T-shaped gasket 16 can be formed of a material which can be compressed sufficiently upon exerting an extra closing force on the mold halves 11 and 12 to provide the desired compression of the congealed latex foam. Also, a telescoping mold can be employed which upon the application of sufficient external force on the mold halves will cause a telescoping of one or both of the mold halves to reduce slightly the height of the mold cavity.

It will be appreciated that, if desired, either or both of the mold sections may be provided with coring pins which project into the mold cavity and form cores which extend inwardly toward the center of the molded latex foam rubber product, such as is shown in U.S. Pat. No. 2,901,773 and U.S. Pat. No. 3,028,610. When coring pins are employed, the flattening of the cells 18, 18 of the congealed latex foam does not appear to be as pronounced in the regions laterally adjacent to the core pins as in the zone between opposing core pins (where coring pins project from each mold section) or between the ends of the core pins and the opposing face of the mold cavity (where core pins project into the mold cavity from only one of the mold sections).

The present invention is applicable to the manufacture of any molded generally flat latex foam rubber product, such as cushioning, mattresses, pillows, and slabs, including products with crowned (i.e. rounded) top and/or bottom broadside faces.

I claim:

1. A process for making a molded generally flat latex foam rubber product which comprises filling a mold cavity with latex foam, congealing the latex foam within the mold cavity, compressing the congealed latex foam in a direction generally normal to the top and bottom broadside faces of the shaped latex foam within the mold cavity and an amount which equals from 0.1 to 5.0 percent of the original height between the top and bottom broadside faces of the congealed latex foam, and vulcanizing the compressed latex foam.

References Cited

UNITED STATES PATENTS

| 2,336,944 | 12/1943 | Madge et al. | 264—50 XR |
| 2,575,259 | 11/1951 | Cox et al. | 264—50 XR |
| 3,006,033 | 10/1961 | Knox | 264—55 |
| 3,056,168 | 10/1962 | Terry | 264—55 |

FOREIGN PATENTS

| 517,813 | 10/1955 | Canada. |
| 658,296 | 10/1951 | Great Britain. |

OTHER REFERENCES

Madge, E. W., Latex Foam Rubber, London, MacLaren & Sons, 1962, pp. 48–49, 97, 99.

PHILIP E. ANDERSON, Primary Examiner

U.S. Cl. X.R.

260—816; 264—50, 321